United States Patent [19]
Young

[11] Patent Number: 4,777,126
[45] Date of Patent: Oct. 11, 1988

[54] OPTICAL RECORDING MEDIA AND METHOD OF MAKING THE MEDIA

[75] Inventor: Peter L. Young, South Barrington, Ill.

[73] Assignee: Optical Materials, Inc., Mercer Island, Wash.

[21] Appl. No.: 771,252

[22] Filed: Aug. 30, 1985

[51] Int. Cl.$^4$ .............................................. G03C 1/00
[52] U.S. Cl. .................................... 430/945; 430/445
[58] Field of Search ............................... 430/495, 945

[56] References Cited

U.S. PATENT DOCUMENTS

| | | | |
|---|---|---|---|
| 4,590,493 | 5/1986 | Inoue et al. | 430/945 |
| 4,614,951 | 9/1986 | Osato et al. | 430/945 |

OTHER PUBLICATIONS

Lou et al., "Bit Oriented Optical Storage With Thin Tellurium Films", *J. Vac. Sci. Technol.*, 18(1), Jan./Feb. 1981, pp. 78–86.
Bell et al., "Antireflection Structures for Optical Recording", *IEEE Journal of Quantum Electronics*, vol. QE-14, No. 7, Jul. 1978, pp. 487–495.
Howe et al., "Solvent-Coated Organic Materials for High-Density Optical Recording", *J. Vac. Sci. Technol.*, 18(1), Jan./Feb. 1981, pp. 92–99.
Drexler, "DREXON TM Optical Memory Media for Laser Recording and Archival Data Storage", *J. Vac. Sci. Technol.*, 18(1), Jan./Feb. (1981), pp. 87–91.
Craighead et al., "Microscopically Textured Optical Storage Media", *Appl. Phys. Lett.* 39(7), 10/1/81, pp. 532–534.
Yoshida et al., "Optical Video Recorder Using Tellurium Sub-Oxide Thin Film Disk", *SPIE*, vol. 329, Optical Disk Technology (1982), pp. 40–45.
Jipson et al., "Laser Writing of Discontinuous Metal Films", *Appl. Phys. Lett.* 43(1), 7/1/83, pp. 27–29.
Freese et al., "Characteristics of Bubble-Forming Optical Direct-Read-After-Write (DRAW) Media", *SPIE* vol. 329, Optical Disk Technology (1982), pp. 174–180.
Lehmann et al., "Dry Etching for Pattern Transfer", *J. Vac. Sci. Technol.*, 17(5), Sep./Oct. 1980, pp. 1177–1183.
Hudson, "Ion Beam Texturing", *J. Vac. Sci. Technol.*, vol. 14, No. 1, Jan./Feb. 1977, pp. 286–289.
Craighead et al., "Microscopically Textured Optical Storage Media", *Appl. Phys. Lett.* 39(7), 10/1/81, pp. 532–534.
Craighead et al., "Textured Thin-Film Si Solar Selective Absorbers Using Reactive Ion Etching", *Appl. Phys. Lett.* 37(7), 10/1/80, pp. 653–655.

*Primary Examiner*—James J. Bell
*Attorney, Agent, or Firm*—Mason, Kolehmainen, Rathburn & Wyss

[57] ABSTRACT

An optical recording media formed of a composite film the coloration of which changes when exposed to a focused laser to store multiple bits of information at a single spot. The media is formed by depositing a metal film on a substrate; oxidizing a layer of the metal film to form an amorphous film; and depositing a dielectric-like film on the amorphous film.

37 Claims, 1 Drawing Sheet

OPTICAL RECORDING MEDIA AND METHOD OF MAKING THE MEDIA

TECHNICAL FIELD

The present invention relates to an optical recording media for mass data storage and to a method of making the media. More particularly, the present invention relates to an optical recording media formed of a composite film which changes its coloration when exposed to a focused laser to store multiple bits of information at one spot.

BACKGROUND OF THE INVENTION

Advances in laser source technology and in optical recording systems have brought about a great demand for a reliable optical recording media which is suitable as a data storage device. To be suitable as a data storage device, the optical recording media should have high sensitivity to a laser for recording data; good signal to noise ratio on play back; no degradation on repeated paay back; durability under normal operating conditions; a resolution of one micron or better; a low bit error rate; and manufacturability at low cost.

One known material which has been proposed as an optical recording media is tellurium. Although tellurium films have adequate sensitivity to a laser for recording data, these films degrade rapidly under normal operating conditions. For example, an unprotected tellurium film with a nominal thickness of 300 Å will oxidize in air in a matter of days, rendering the material completely useless.

In order to prolong the life of tellurium films, alloys of tellurium have been developed. However, it has been found that these tellurium alloys are not sufficiently sensitive to laser recording. Tellurium films have also been enclosed in an inert gas sandwich in order to increase its durability. However, the cost of making an optical recording disc from the sandwiched tellurium is prohibitively expensive.

For increased recording sensitivity, a tri-layer film consisting of a metal reflector, a dielectric spacer and a thin tellurium film, on the order of 50–100 Å, has also been proposed. Because the tellurium film is so thin, however, the durability of this tri-layer media is even worse than the single layer tellurium media.

SUMMARY OF THE INVENTION

In accordance with the present invention, the disadvantages of prior optical recording medias as discussed above have been overcome. The optical recording media of the present invention is formed of a composite film which changes its coloration when exposed to a focused laser. This media is highly sensitive to a laser for recording data; is very durable and stable in normal operating environments; has excellent resolution for optical recording; has a low bit error rate; and is easily manufactured at low cost.

In order to form the optical recording media of the present invention a metal film is first deposited on a substrate. An amorphous layer is next formed such as by oxidizing a thin layer of the metal film. Thereafter, lead or a lead alloy is evaporated onto the amorphous layer in the presence of an inert gas to form a dielectic-like film.

The amorphous layer of the optical recording media allows the dielectric-like film to be formed having a particular structure which can trap light for coloration. When a spot on the optical recording media is heated by exposure to a focused laser, the coloration of the dielectric-like film changes to allow multiple bits of information to be stored at a single spot. More particularly, the laser may be focused on a spot of the dielectric-like film and controlled to change the color thereof to, for example, red, gold, blue or metallic so that the color of a single spot may represent multiple bits of information.

The thickness of the composite film forming the optical recording media may vary from a few hundred angstroms to a few thousand angstroms. Since the film need not be extremely thin as in the prior art, the bit error rate for the optical recording media is very low.

Further, the optical properties of the composite film may be easily adjusted to accommodate lasers with different wavelengths. These and other objects and advantages of the invention, as well as the details of an illustrated embodiment, will be more fully understood from the following description and the drawings.

BEST MODE FOR CARRYING OUT THE INVENTION

The optical recording media of the present invention is a composite film, the coloration of which changes when the film is exposed to a laser to store multiple bits of information represented by various colors.

Figure 1:
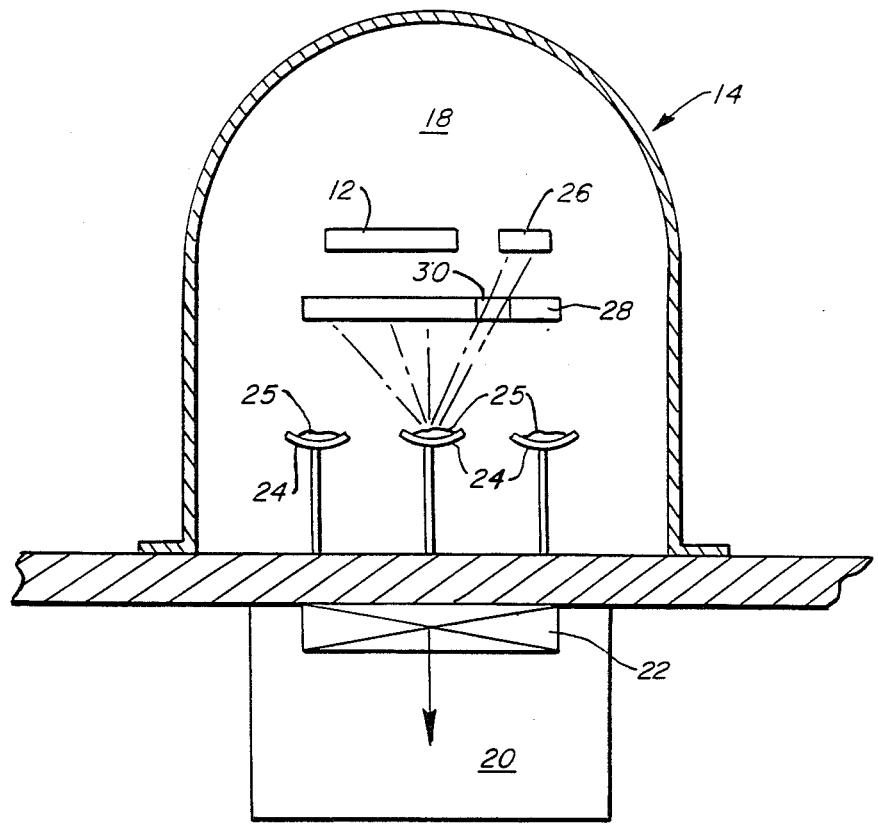
FIG. 1 is a cross-sectional view of a high vacuum system used to form the optical recording media of the present invention.
Figure 2:
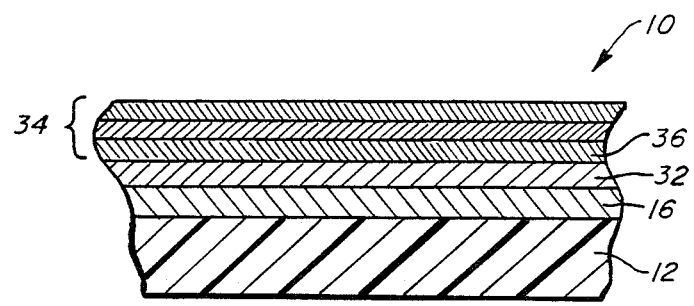
FIG. 2 is a cross-sectional view of the optical recording media of the present invention.

As seen in FIG. 2, the optical recording media 10 includes a substrate 12 which may be made of glass, plastic or metal. The substrate 12 provides a flat surface on which the composite film is formed to provide the optical recording media. The substrate is placed in a high vacuum system 14 shown in FIG. 1 in order to deposit a metal film 16 thereon by thermal evaporation.

The vacuum system 14 includes a chamber 18 which is evacuated by a pumping station 20 through a valve 22. The substrate 12 is positioned within the evacuated chamber 18 with respect to one or more thermal evaporation boats 24. The boats 24 are typically made of tungsten and are electrically heated by a power supply, not shown, to thermally evaporate the material 25 carried thereon to coat the substrate 12. A quartz thickness monitor 26 is positioned adjacent to the substrate 12 in order to monitor the evaporation rate of the material 25 and the thickness of the coating layer during the process. A shutter 28 having a hole 30 therein allows the material 25 to evaporate and coat the thickness monitor while protecting the substrate 12. When the desired evaporation rate is obtained, as determined by the quartz thickness monitor 26, the shutter 28 is opened to allow the substrate 12 to be coated by the material 25.

The thickness of the metal film 16 evaporated onto the substrate 12 should be such as to provide a highly reflective surface and may vary from several hundred ahgstroms to several thousand angstroms. The film 16 should be made of a metal which is capable of being oxidized such as aluminum, niobium, lead or a lead alloy.

Next, a thin amorphous film 32 is formed on the metal film 16. The amorphous film is preferably an oxide film which is formed by the thermal oxidation, r-f oxidation or electrochemical anodization of the metal film 16. The thickness of the amorphous film 32 is not important and may be a few angstroms to a few hundred angstroms thick as long as the surface of this layer is non-metallic.

The amorphous or oxide film 32 allows a dielectric-like film 34 to be formed on top thereof in a particular structure which can trap light for coloration. The dielectric-like film 34 may be a metal or metal alloy film, preferably having a low melting point. The dielectric-like film exhibits optical properties smilar to a dielectric material. Unlike a dielectric material, however, the dielectric-like film is highly absorbent and when it is subjected to localized heating by a laser or the like, the film changes its coloration. When exposed to various amounts of laser radiation, the dielectric-like film 34 may change colors, for example, from red to gold to blue to a reflective metallic.

The dielectric-like film 34 may contain lead; lead and indium; lead and gold; lead, indium and gold; lead and tin; or lead, indium and tin for example. Where a lead alloy is to form the dielectric-like film 34, the lead is always coated onto the substrate 12 first as follows. The chamber 18 is evacuated to a pressure of $5 \times 10^{-6}$ torr or lower. Thereafter, an inert gas, preferably argon, is leaked into the chamber to bring the pressure within the chamber to approximately $40 \times 10^{-3}$ torr. Although a chamber pressure of $40 \times 10^{-3}$ torr is preferred, the pressure may range from $5 \times 10^{-3}$ torr to $500 \times 10^{31\ 3}$ torr. The pressure of $40 \times 10^{-3}$ torr is maintained in the vacuum chamber 18 by allowing the argon gas to flow into the chamber at a low rate as needed. When the pressure within the vacuum chamber 18 is stabilized, lead carried on the thermal evaporation boats 24 is thermally evaporated onto the substrate 12 at a rate of 2–25 Å/sec. to form a layer of lead 36, the preferred rate being 10 Å/sec. Thereafter, indium and/or gold may be thermally evaporated onto the lead covered substrate 12 at a rate of 2–25 Å/sec. for indium and a rate of approximately 1–10 Å/sec. for gold wherein the preferred rate for induim is 10 Å/sec. The deposition angle for each of the lead, indium and gold is preferably zero wherein the evaporation boats are placed approximately 15 inches from the substrate 12. Although the thickness of the dielectric-like film may vary, a typical film may consist of 650 Å of lead, 200 Å of indium and 20 Å of gold.

After the dielectric-like metal film 34 is deposited onto the amorphous or oxide film 32, the substrate may be annealed at 70° C. to cause an inter-diffusion of the metals forming the dielectric-like layer so as to enhance the durability of the optical recording media. The substrate may also be annealed in the presence of oxygen to allow a thin layer of indium oxide to form a protective coating over the entire composite film.

The optical recording media 10, formed as described above, will not apper metallic, as one would expect from a normal film deposited in a high vacuum system. The recording media will exhibit strong coloration depending on the inert gas pressure, the deposition rate for the metal components, the angle of deposition, and the thickness of the dielectric-like metal film. For the conditions described above, the film will appear to be dark blue in color so as to be highly light absorbent. By varying the thickness of the dielectric-like material film 34, a film of gold, purple, light blue and green color can also be obtained.

The coloration of the optical recording media 10 is obtained by depositing a lead or lead alloY film under high inert gas pressure onto an amorphous film such as an oxide which allows the lead to grow in a particular structure which can trap light. When the dielectric-like film growing on the oxide layer is deposited on top of a metal reflector, strong absorption of light can occur in the wavelength where the film thickness of the dielectric-like film is equal to $n \times (\lambda/N \times 2)$, where n is an integer and N is the effective index of refraction of the dielectric-like metal film.

In order to store data, the optical recording media 10 is exposed to a focused laser which provides localized heating of the spot on the media at which the laser beam is focused. Upon heating the dielectric-like film to various degrees, the color of the film will change, for example, from red to gold to blue and finally to a metallic which is highly reflective. Because the color of the dielectric-like film may be varied depending on the amount of laser exposure, one spot on the optical recording medium can define multiple bits of information. For example, the color red, may represent the bits 001, the color gold may represent 010, the color blue may represent 011 and the metallic color may represent 100. Because a single spot on the optical recording media of the present invention can represent multiple bits of information, the optical recording media is capable of storing a much larger amount of data than has heretofore been possible by prior optical recording medias.

I claim:

1. A method for making an optical recording media formed of a composite film having changeable coloration comprising the steps of:
   forming a first metal film, capable of being oxidized, on a substrate in a high vacuum system;
   oxidizing a layer of said first metal film to form an amorphous film on said metal film; and
   depositing a second metal film on said amorphous film in the presence of an inert gas to form a dielectric-like film, the coloration of the dielectric-like film changing when subjected to localized heating by a laser.

2. The method of claim 1 wherein the oxide layer is formed by thermal oxidation.

3. The method of claim 1 wherein the oxide layer is formed by r-f oxidation.

4. The method of claim 1 wherein the oxide layer is formed by electrochemical anodization.

5. The method of claim 1 wherein the inert gas is argon and the second metal film is deposited in a chamber containing the argon gas and having a pressure between $5 \times 10^{31\ 3}$ torr and $500 \times 10^{-3}$ torr 6. The method of claim 1 wherein the second metal film layer is formed by thermal evaporation.

7. The method of claim 1 wherein the step of depositing the second metal film includes the step of depositing a layer of lead on the amorphous film.

8. The method of claim 7 wherein the lead is deposited by thermal, evaporation at a rate of 2–25 Å/sec.

9. The method of claim 7 wherein the step of forming the dielectric-like film includes the step of depositing a layer of indium on said layer of lead.

10. The method of claim 9 wherein the indium is deposited by thermal evaporation at a rate of 2–25 Å/sec.

11. The method of claim 7 wherein the step of forming the dielectric-like film includes the step of depositing a layer of gold on said layer of lead.

12. The method of claim 11 wherein the gold is deposited by thermal evaporation at a rate of 1–10 Å/sec.

13. The method of claim 7 wherein the step of forming dielectric-like film includes the step of depositing gold and indium on the layer of lead.

14. The method of claim 13 wherein the lead, indium and gold are deposited by thermal evaporation at a rate of 2-25 Å/sec. for lead, at a rate of 2-25 Å/sec. for indium, and at, a rate of 1-10 Å/sec. for gold.

15. The method of claim 1 further including the step of annealing the composite film on the substrate to form the optical recording media.

16. A method for making an optical data storage device comprising:
depositing a first metal film, capable of being oxidized, on a substrate in a high vacuum system;
oxidizing a layer of said first metal film to form an amorphous film on said metal film;
depositing a second metal film on the amorphous film in the presence of an inert gas to form an optical recording media; and
exposing a spot on the optical recording media to a focused laser to change the coloration of said spot on the media to store data.

17. The method of claim 16 wherein the second metal film forms a dielectric-like film on the amorphous film.

18. The method of claim 16 wherein the step of depositing the second metal film includes the step of depositing a layer of lead.

19. The method of claim 18 wherein the step of depositing the second metal film further includes the step of depositing indium on the layer of lead.

20. The method of claim 18 wherein the step of depositing the second metal film further includes the step of depositing gold on the layer of lead.

21. The method of claim 18 wherein the step of depositing the second metal film includes the step of depositing indium and gold on the layer of lead.

22. The method of claim 21 wherein the lead, gold and indium are deposited in a chamber in the presence of argon gas, the pressure in the chamber being between $5 \times 10^{-3}$ torr and $500 \times 10^{31\ 3}$ torr.

23. The method of claim 16 further including the step of annealing the optical recording media.

24. The method of claim 16 wherein the step of exposing the media to a laser includes the step of storing multiple bits of information at the spot exposed to the laser.

25. The method of claim 16 wherein the step of exposing the media to a laser includes focusing the laser on a spot on the optical recording media to change the coloration of the spot, the color of the spot representing multiple bits of information.

26. The method of claim 25 wherein the optical recording media is exposed to a laser to change the coloration of the media to red.

27. The method of claim 25 wherein the optical recording media is exposed to a laser to change the coloration of the media to blue.

28. The method of claim 27 wherein the optical recording media is exposed to a laser to change the coloration of the media to gold.

29. The method of claim 25 wherein the optical recording media is exposed to a laser to change the coloration of the media to metallic.

30. A optical recording media which changes its coloration to store data when subjected to heat comprising:
a substrate;
a metal film, capable of being oxidized, formed on the substrate in a high vacuum system;
an amorphous film formed on the metal film by oxidation of a layer of the metal film;
a dielectric-like film formed on the amorphous film, the coloration of the dielectric-like film changing when subjected to localized heating by a laser.

31. The optical recording media of claim 30 wherein the substrate is made of glass, plastic or metal.

32. The optical recording media of claim 30 wherein the metal film includes niobium.

33. The optical recording media of claim 32 wherein the thickness of the metal film is greater than or equal to 500 Å.

34. The optical recording media of claim 30 wherein the dielectric-like film includes lead.

35. The optical recording media of claim 30 wherein the dielectric-like film includes lead and indium.

36. The optical recording media of claim 30 wherein the dieletric-like film includes lead and gold.

37. The optical recording media of claim 30 wherein the dielectric-like film includes lead, gold and indium.

* * * * *

UNITED STATES PATENT AND TRADEMARK OFFICE
CERTIFICATE OF CORRECTION

PATENT NO. : 4,777,126

DATED : October 11, 1988

INVENTOR(S) : Peter L. Young

Page 1 of 2

It is certified that error appears in the above-identified patent and that said Letters Patent is hereby corrected as shown below:

Column 1, line 22, change "paay" to --play--.

Column 2, line 62, change "ahgstroms" to --angstroms--.

Column 3, line 10, change "smilar" to --similar--.

Column 3, line 28, change "500 x $10^{31}$ $^3$" to --500 x $10^{-3}$--.

Column 3, line 49, change "C." to --C--.

Column 3, line 56, change "apper" to --appear--.

Column 3, line 68, change "alloY" to --alloy--.

IN THE CLAIMS

In Claim 5 at Column 4, line 50, change "5 x $10^{31}$ $^3$" to --5 x $10^{-3}$--.

In Claim 13 at Column 5, line 2, after "forming" insert --the--.

In Claim 14 at Column 5, line 7, after "at" delete --,--.

In Claim 22 at Column 5, line 42, change "500 x $10^{31}$ $^3$" to --500 x $10^{-3}$--.

UNITED STATES PATENT AND TRADEMARK OFFICE
CERTIFICATE OF CORRECTION

PATENT NO. : 4,777,126
DATED : October 11, 1988
INVENTOR(S) : Peter L. Young

It is certified that error appears in the above-identified patent and that said Letters Patent is hereby corrected as shown below:

In Claim 30 at Column 6, line 20, change "A" to --An--.

Signed and Sealed this

Sixth Day of June, 1989

Attest:

DONALD J. QUIGG

*Attesting Officer*  *Commissioner of Patents and Trademarks*